Dec. 29, 1931.  E. E. GREVE  1,838,615
SELF ALIGNING SHAFT END BEARING
Filed June 30, 1928  2 Sheets-Sheet 1
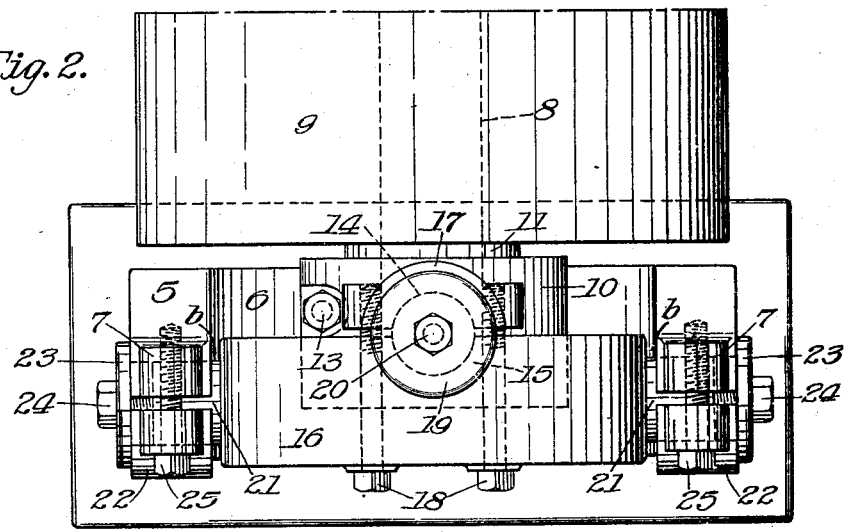
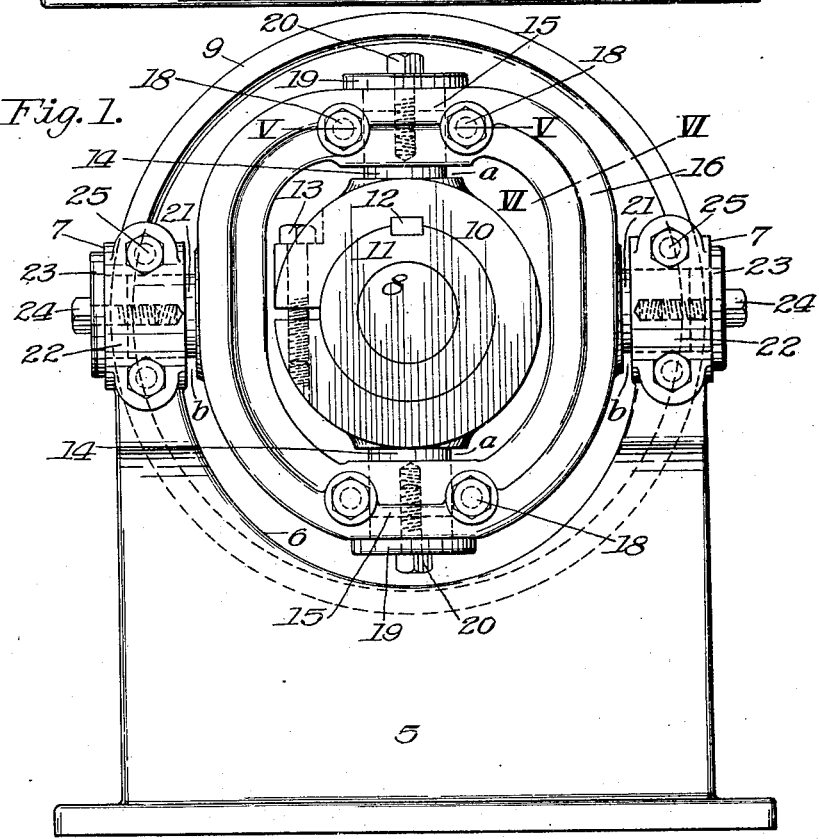
INVENTOR
E. E. Greve
by W. J. Doolittle
Attorney Dec. 29, 1931.  E. E. GREVE  1,838,615
SELF ALIGNING SHAFT END BEARING
Filed June 30, 1928   2 Sheets-Sheet 2
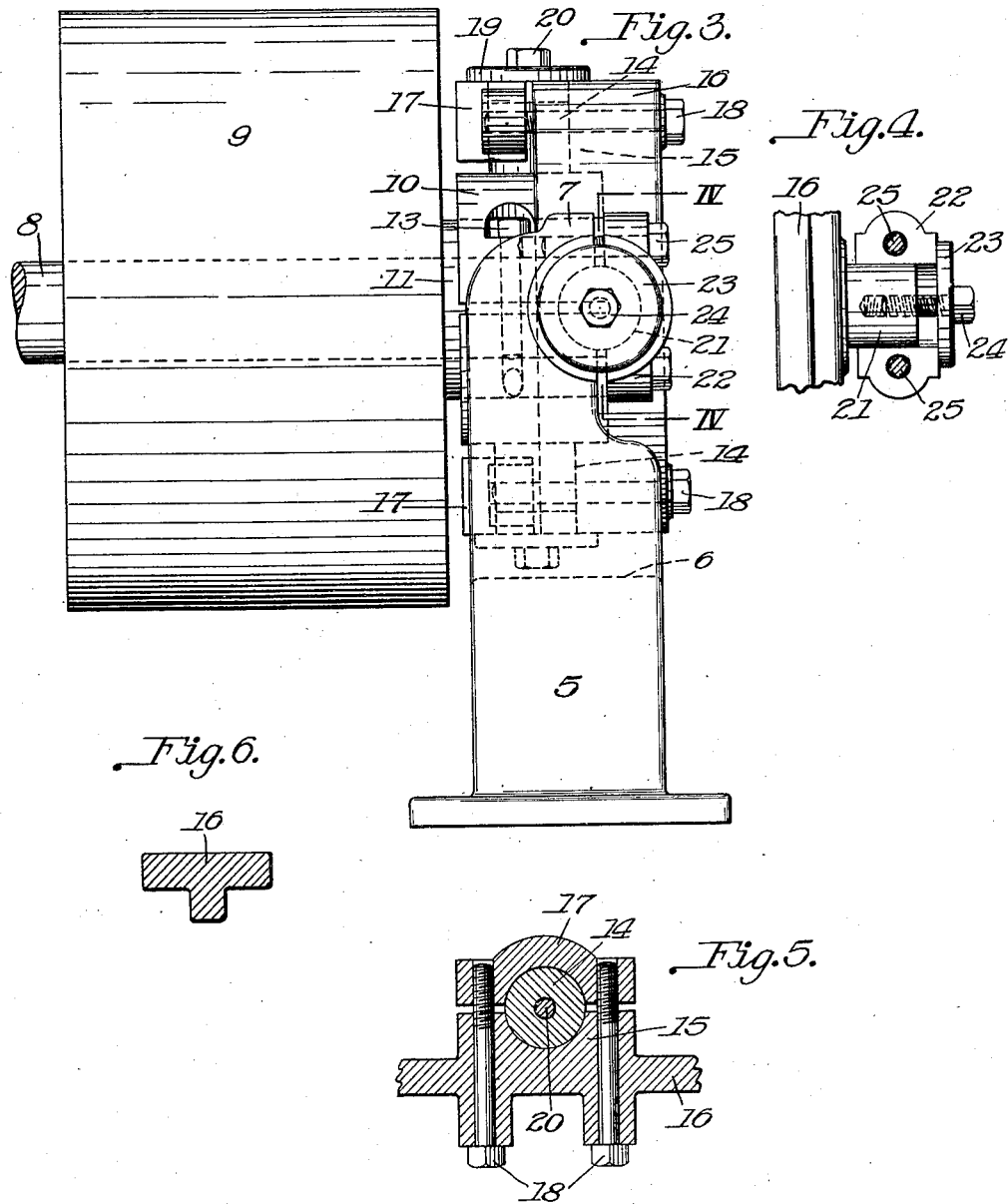
INVENTOR Patented Dec. 29, 1931

1,838,615

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

SELF ALIGNING SHAFT END BEARING

Application filed June 30, 1928. Serial No. 289,469.

This invention relates to improvements in self-aligning shaft bearings and more particularly to self-aligning or self-adjusting shaft end bearings.

The prime object of my invention is to provide a simple and efficient bearing embodying a construction that is self-aligning and one that has a limited universal movement to compensate for misalignment of a shaft in connection with which the bearing is employed.

In the accompanying drawings, which illustrate an application of my invention:

Fig. 1 is an end elevational view of a shaft end bearing embodying my invention;

Fig. 2, a top plan view;

Fig. 3, a side elevational view;

Fig. 4, a fragmentary detail view taken on the line IV—IV of Fig. 3, showing a trunnion adjusting means;

Fig. 5, a detail sectional view taken on the line V—V of Fig. 1, and

Fig. 6, a detail sectional view taken on the line VI—VI of Fig. 1.

Referring to the drawings, 5 designates a pedestal having a semi-circular shaft bearing receiving portion 6 and two spaced-apart bearing portions or boxes 7, the latter being designed to receive a pair of trunnions constituting parts of the shaft bearing structure embodying my invention.

As illustrated, I have shown the shaft 8 having a pulley wheel 9 mounted thereon; the end of this shaft 8 is mounted in a self-aligning shaft bearing including as shown and as preferred, a split spider or sleeve 10 having a bushing 11 inserted therein and secured to the sleeve by a key 12. The free ends of the sleeve or spider are adjustably connected by a screw-bolt 13 and the said sleeve is formed with or provided with two diametrically disposed trunnions 14, the latter being designed to be received in and be rotatably mounted in oppositely disposed enlarged bearing portions or boxes 15 formed on a pivotally mounted yoke 16; said trunnions are maintained in operative positions within the bearings of the enlarged portions 15 by means of bearing caps 17 secured to the said enlarged portions of the yoke by screw-bolts 18, and by cap-plates 19 and set-screws 20. It will be noted that the cap-plates 19 co-acting with the set-screws 20 limit the end movements of the trunnions, and that by manipulating the set-screws 20 together with similar set-screws employed in connection with yoke-trunnions, hereinafter referred to, the entire shaft bearing may be lined up with the shaft 8 in a manner similar to lining up a chuck on a lathe.

Yoke 16 is preferably T-shape in cross section and in addition to being provided with the enlarged portions 15 it is provided with a pair of trunnions 21 by which the yoke is mounted in the bearings 7 of the pedestal 5. Cap-bearings 22 similar to the bearing-caps 17 above described are employed and also similar cap-plates 23 and adjusting or set-screws 24.

In applying my improved bearing to the shaft 8, bushing 11 with its feathered key 12 is first passed over the outer end of the shaft after which spider or sleeve 10 carrying the trunnions 14 is positioned thereon; then yoke 16 is passed into operative position with bearing portions 15 engaging trunnions 14 and yoke-trunnions 21 placed in the pedestal boxes 7. The cap-bearings 17 to the rear of the trunnions 14 and cap-bearings 22 at the front of trunnions 21 are now secured by means of the bolts 18 and 25 respectively. The two pairs of trunnions employed and the bearings therefor are disposed at approximately right angles to each other.

After the bearing is positioned on the shaft, it may initially be brought into the desired operative position or lined up relatively to the shaft by manipulating the adjusting screws 20 and 24; in this connection it will be noted, that I have provided sufficient space between the spider and the yoke indicated by $a$, and likewise sufficient space $b$, between the yoke and the bearings for its trunnions, to provide for this adjustment. By means of this simple adjusting feature, I do away with necessity of shimming or wedging the pedestal in order to secure the desired alignment.

It will be noted that by means of the construction described, I have provided a bearing that is self-aligning and has a limited universal movement to compensate for misalignment of a shaft.

I claim:

1. In a shaft bearing, a bearing spider, trunnions for the spider, a yoke embracing the spider, bearings carried by the yoke in which the spider trunnions are pivotally and adjustably positioned, means for slidably adjusting the spider trunnions relative to their bearings, trunnions on the yoke, a support having bearings in which the yoke trunnions are pivotally and adjustably mounted, and means for slidably adjusting the yoke trunnions relative to their bearings, said first and second adjusting means each including a cap plate and a screw element.

2. In a shaft bearing, a split bearing spider having a metallic bushing keyed to the spider, said spider having diametrically disposed trunnions thereon, a yoke embracing the spider and having trunnion-receiving means in which the spider trunnions are entered, trunnions on the yoke, and a pedestal having trunnion-receiving members in which the yoke-trunnions are entered.

3. In a shaft bearing, a bearing spider having trunnions, a yoke embracing the spider and having trunnions thereon, bearings carried by the yoke, said spider trunnions pivotally and shiftably mounted in the bearings carried by the yoke, means for shifting the spider trunnions relative to their bearings, a support having bearings in which the yoke trunnions are pivotally and shiftably mounted, and means for shifting the yoke trunnions relative to their bearings.

4. In a shaft bearing, a pivotally mounted bearing spider in the form of a split clamp, a pivotally mounted yoke having bearings in which the spider is mounted, a support for the yoke having bearings in which the yoke is mounted, means for adjustably sliding said spider in the bearings of the yoke, and means for adjustably sliding said yoke in the bearings of the support.

In testimony whereof I affix my signature.

EDGAR E. GREVE.